No. 735,567. PATENTED AUG. 4, 1903.
C. S. McGOWAN.
HORSESHOER'S HORSE HOLDING MACHINE.
APPLICATION FILED DEC. 7, 1901. RENEWED SEPT. 27, 1902.
NO MODEL. 2 SHEETS—SHEET 1.
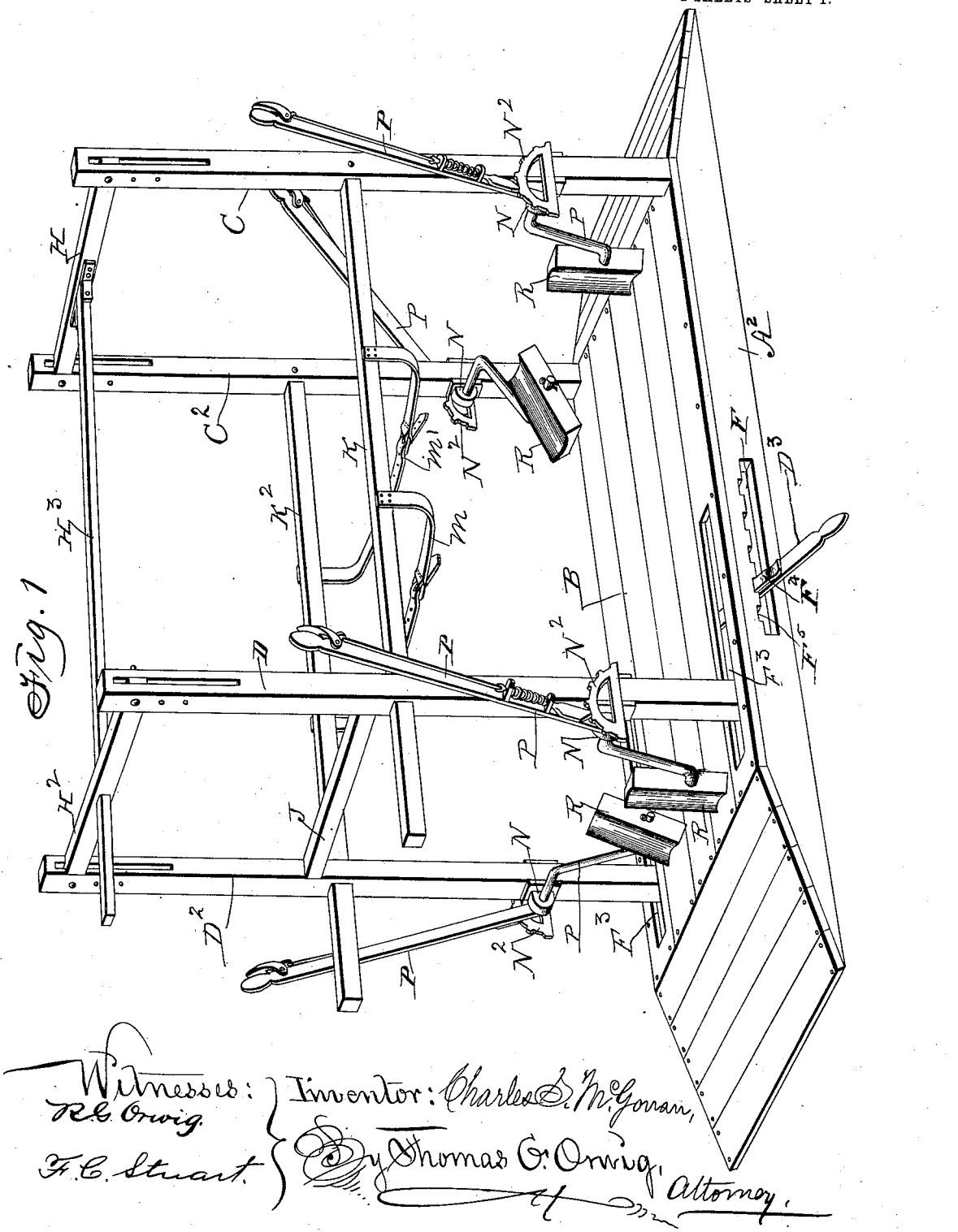

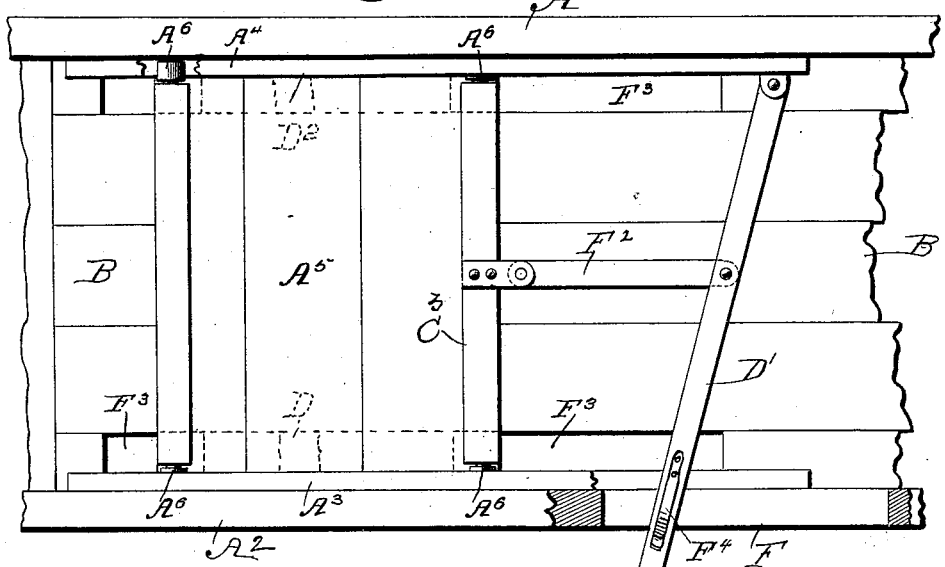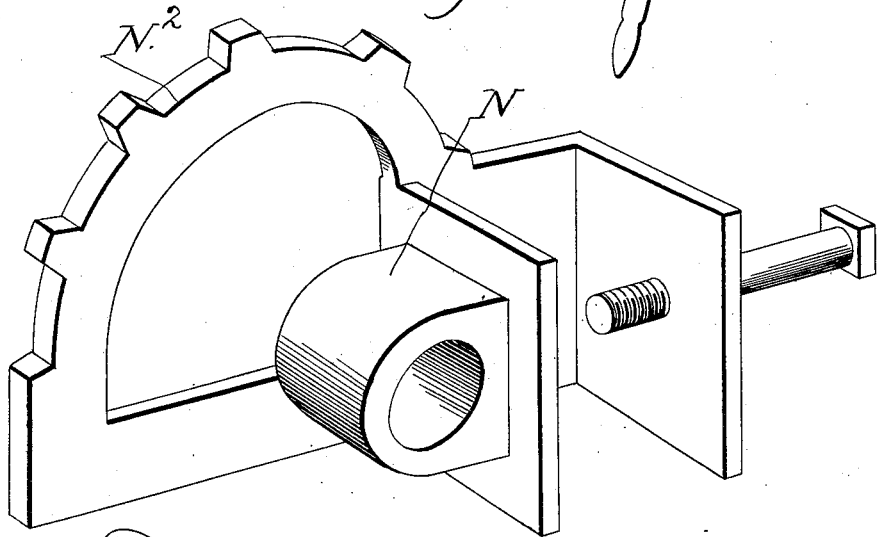

No. 735,567.

Patented August 4, 1903.

UNITED STATES PATENT OFFICE.

CHARLES S. McGOWAN, OF DESOTO, IOWA.

HORSESHOER'S HORSE-HOLDING MACHINE.

SPECIFICATION forming part of Letters Patent No. 735,567, dated August 4, 1903.

Application filed December 7, 1901. Renewed September 27, 1902. Serial No. 125,129. (No model.)

*To all whom it may concern:*

Be it known that I, CHARLES S. MCGOWAN, a citizen of the United States, residing at Desoto, in the county of Dallas and State of Iowa, have invented a new and useful Horseshoer's Horse-Holding Machine, of which the following is a specification.

My object is to prevent the straining and injury incident to man and animals in the process of shoeing horses and to avoid the labor of holding up horses' legs and to facilitate the work of trimming hoofs and nailing on shoes.

My invention consists in the machine adapted to be adjusted and operated for holding horses of different sizes, hereinafter set forth, pointed out in my claims, and illustrated in the accompanying drawings, in which—

Figure 1 is a perspective view of the complete machine, showing all the parts in place, as required, for admitting and fastening a horse therein, so that his legs can be successively lifted and retained in an elevated position and the hoof be advantageously trimmed and a shoe nailed on or taken off without applying hand force to the leg. Fig. 2 is an enlarged portion of the machine inverted endwise and shows a sliding base for supporting and carrying two posts and adjusting them and the machine, as required, to suit horses of different lengths. Fig. 3 is an enlarged detail view of a device adapted for pivotally connecting hand-levers with the corner-posts to be used for lifting and holding an animal's legs elevated and bent, so the hoofs will be in proper position for taking off and nailing on shoes.

The letters A and $A^2$ designate the parallel sides, and B the fixed floor, of a platform adapted to support a horse. The ends of the platform are inclined.

$C'$ and $C^2$ are corner-posts fixed to the front end of the platform, and D and $D^2$ are corner-posts fixed to a base adjustably connected with the rear end portion of the platform, as shown in Fig. 2.

$A^3$ and $A^4$ are tracks fixed to the inside faces of the parallel sides A and $A^2$ to support an adjustable base $A^5$, provided with rollers $A^6$ at its corners to travel on said fixed tracks and to carry the posts D and $D^2$, fixed on the base, as indicated by dotted lines.

$D^3$ is a lever fulcrumed to the side A of the platform-frame extended through an elongated opening F in the side $A^2$ and connected with the adjustable base $A^5$ by means of a link $F^2$ in such a manner that the posts D and $D^2$, fixed on top of the base $A^5$, can be moved backward and forward in the parallel elongated openings $F^3$, that extend longitudinally in the rear portion of the platform. A spring $F^4$, fixed to the lever D, normally engages a rack $F^5$, formed on or fixed to the upper edge of the slot F, through which the lever D extends, as shown in Fig. 1.

The top end portion of each of the four corner-posts is provided with a vertical slot, and H and $H^2$ are cross-pieces provided with tenons on their ends fitted in said slots, so they can slide up and down therein.

$H^3$ is a straight bar fixed to the front cross-bar H and extended through a central mortise in the rear cross-bar $H^2$. The posts and tenons on the ends of the cross-bars are provided with transverse bores, so the bars can be fastened to the posts at different points of elevation, as required, to engage the backs of horses that differ in height.

J is a cross-bar fixed to the central portions of the rear and adjustable posts D and $D^2$ to engage the buttocks of an animal when fastened in the machine.

K and $K^2$ are side bars fixed to the central portions of the front fixed posts C and $C^2$ and extended through mortises in the rear posts D and $D^2$ in such a manner that the rear posts can slide backward and forward thereon, as required, in adjusting the rear posts relative to the length of an animal.

$m$ and $m'$ are girths fixed to the side bars K and $K^2$ and adapted to be adjusted to engage the under sides of the bodies of animals, as required, to aid in retaining them in standing positions in the machine.

N represents fulcrums for levers adapted to stride the corner-posts and to be adjustably fastened thereto by means of bolts extended through perforations, as shown in Fig. 1.

$N^2$ represents segmental racks formed on or fixed to the irons or fulcrums N, and P represents elbow-shaped hand-levers mounted in the adjustable fulcrums N and provided with spring-actuated pawls to engage the racks $N^2$. On the horizontal inward extensions of the levers P are pivoted cushioned blocks R, adapted to rotate in vertical planes and to engage horses' legs in such a manner that the legs can be lifted by means of the levers and held stationary in such positions, as required, to enable a person to trim the hoofs and to take off and nail on shoes without touching or holding the legs by hand.

In the practical use of my invention a horse is backed over the front of the platform and into the machine and the adjustable parts fitted to him, as required, to fasten and retain him standing and his legs then successively elevated and held while old shoes are taken off, the hoofs trimmed, and new shoes nailed on.

Having thus described the construction and operation of my invention, its practical utility will be readily understood by persons familiar with the art to which it pertains, and

What I claim as new, and desire to secure by Letters Patent, is—

1. In a machine for holding and shoeing horses, a platform having two fixed corner-posts at its front end, parallel slots in its rear end portion and two rear corner-posts extended down through said slots and rigidly connected by fixed cross-bars below the platform and means for adjusting and fastening the rear posts to the platform and means for holding an animal for the purposes stated.

2. In a machine for holding and shoeing horses, a platform having fixed corner-posts at one end and corner-posts extended through parallel longitudinal openings in the other end of the platform and rigidly connected below the platform by means of a cross-bar, a lever pivoted to one side of the platform and extended horizontally through an opening in the other side of the platform, a link pivotally connected with the said cross-bar and said lever and means for locking the lever arranged and combined to operate in the manner set forth for the purposes stated.

3. In a machine for holding and shoeing a horse, a platform having two fixed posts at its front and a side bar fixed to the central portion of each of said posts and two adjustable posts at its rear end adjustably connected with said side bars and said posts provided with a vertically-adjustable cross-bar, at their top end portions a straight bar fixed to the front cross-bar and adjustably connected with the rear cross-bar, arranged and combined to operate in the manner set forth for the purposes stated.

4. In a machine for holding and shoeing a horse, a platform having two fixed posts at its front end and two adjustable posts at its rear end and each post provided with a vertically-adjustable cross-bar, a straight bar fixed to the front cross-bar and adjustably connected with the rear cross-bar, arranged and combined to operate in the manner set forth for the purposes stated.

5. In a machine for holding and shoeing a horse, a platform and two posts fixed to its front portion in parallel position, two corner-posts extended down through slots in the platform and rigidly connected below the platform, a cross-bar fixed to the central portions of said posts means for adjusting said posts in said slots, side bars fixed to the central portions of said fixed front posts and adjustably connected with the central portions of the rear adjustable posts and adjustable girths fixed to said side bars, all arranged and combined to operate in the manner set forth for the purposes stated.

6. A machine for holding and shoeing horses, comprising a platform having fixed corner-posts at its front end, an adjustable base having fixed corner-posts, means for adjusting the said base and rear posts carried thereby backward and forward relative to the platform, a vertically-adjustable cross-bar at the tops of the front fixed posts, a vertically-adjustable cross-bar at the top ends of the adjustable rear posts, a bar fixed to the cross-bar at the tops of the front posts and adjustably connected with the adjustable cross-bar at the tops of the rear adjustable posts, side bars fixed to the central portions of the front fixed posts and adjustably connected with the central portions of the rear adjustable post and girths fixed to said side bars levers fulcrumed to the corner-posts, devices for lifting and holding horses' legs pivotally connected with said levers, means for locking the levers and means for retaining the adjustable rear corner-posts stationary, arranged and combined to operate in the manner set forth for the purposes stated.

CHARLES S. McGOWAN.

Witnesses:
P. S. McGOWAN,
C. W. McKELLIPS.